C. NELSON.
CULINARY ARTICLE.
APPLICATION FILED DEC. 14, 1909.
1,022,438.
Patented Apr. 9, 1912.
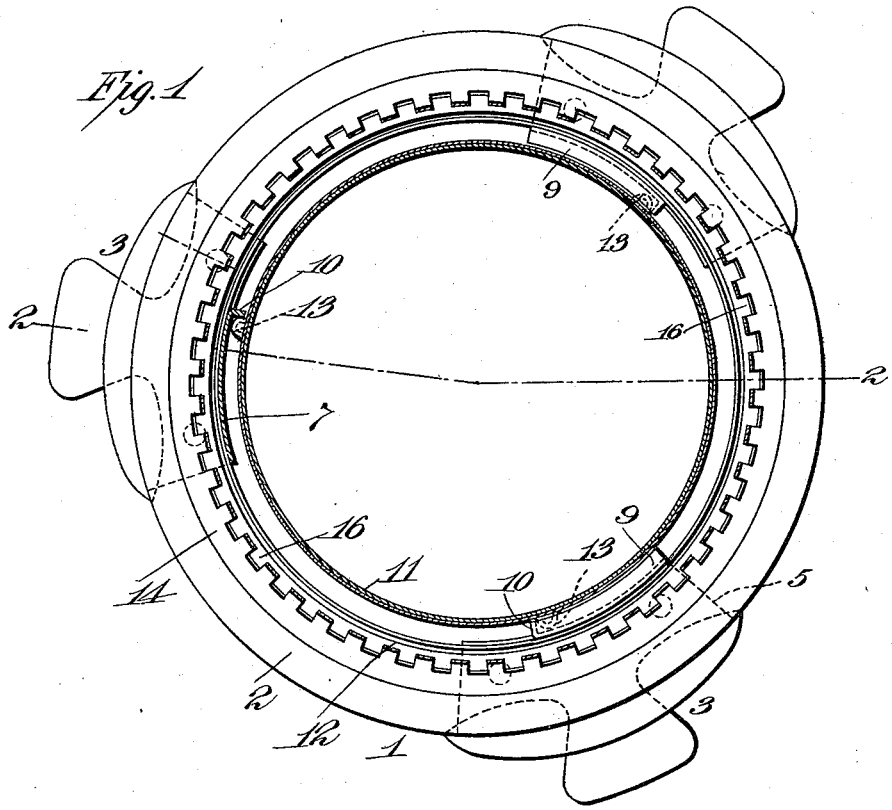
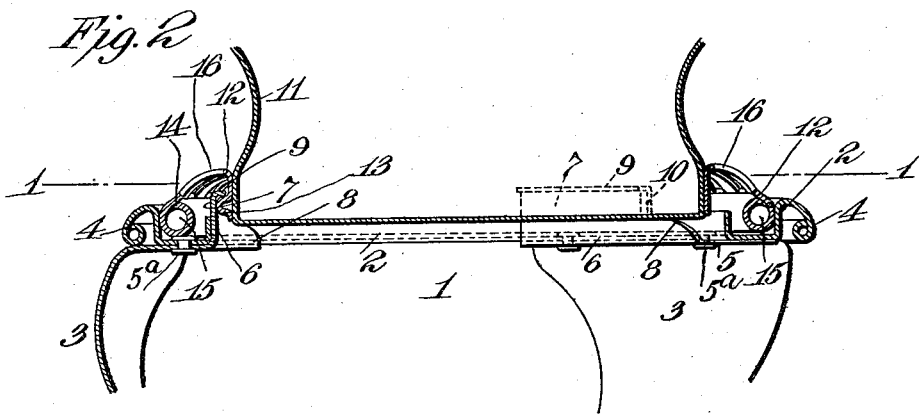
Witnesses:
Jas. F. Coleman
John S. Lokch
Inventor
Charles Nelson
By Dyer & Dyer
his Attorneys.
COLUMBIA PLANOGRAPH CO., WASHINGTON, D. C.

UNITED STATES PATENT OFFICE.

CHARLES NELSON, OF NEW YORK, N. Y., ASSIGNOR TO S. STERNAU & COMPANY, OF BROOKLYN, NEW YORK, A COPARTNERSHIP.

CULINARY ARTICLE.

1,022,438.  Specification of Letters Patent.  Patented Apr. 9, 1912.

Application filed December 14, 1909. Serial No. 533,062.

*To all whom it may concern:*

Be it known that I, CHARLES NELSON, a citizen of the United States, residing in the borough of Brooklyn, city of New York, county of Kings, and State of New York, have invented a certain new and useful Culinary Article, of which the following is a specification.

The object I have in view is the production of a locking device for the attachment of coffee machines, chafing dishes, kettles and other similar culinary articles to the metal supporting stand, by means of which the structure will be simplified and rendered stronger than has heretofore been the case, as well as to provide an arrangement in which the heat in the culinary article will be insulated from the stand. These and further objects will appear from the following specification and accompanying drawings, considered together or separately.

In the drawings: Figure 1 is a horizontal sectional view of a coffee machine stand and utensil embodying my invention, taken on the line 1—1 of Fig. 2; Fig. 2 is a section on the line 2—2 of Fig. 1.

In both of the views like parts are designated by the same reference characters.

The stand 1 comprises an annulus 2 and legs 3. The annulus is shown as formed of sheet metal of U section, forming an annular trough. On the outside is a depending bead 4. In order to provide a finish and obviate a sharp outer edge, this bead 4 is turned up underneath on the inside, as shown, and is of such a diameter that it comes in contact with the stand legs outside of the annulus, as shown in Fig. 2. The legs, as shown, are made of sheet metal stamped to shape, although the material and the manner of manufacturing may be changed without departing from the spirit of the invention. On top of each the material is bent over as at 5, so as to engage with the lower portion of the annulus 2. The legs are secured to this annulus by rivets 5$^a$ or other fastenings, as shown. From the bent over portion 5 the leg is bent up at 6 so that it comes in close contact with the inner edge of the annulus. The leg is continued above the annulus, forming a portion 7 of less length than the width of the leg, the other portion of the leg being curved at 8. The upper edge of the portion 7 is bent inward at 9 forming a hook. The vertical edge of the portion 7, adjacent to the curved portion 8, is also bent inward at 10, forming a vertical abutment. These portions of the leg form one member of the locking device for attaching the utensil to the stand.

The utensil 11 is provided at its bottom with an annulus 12. On this annulus are a number of lugs 13, such lugs corresponding in number and spacing with the legs of the stand. These lugs in combination with the hooks 9 form the locking device for attaching the utensil to the stand, the lugs lying under the hooks and engaging with them. The utensil is adjusted in place by introducing the bottom of the utensil with its annulus 12 into the annulus 2 of the stand, causing the lugs 13 to pass below the horizontal plane of the hooks 9. The utensil is then given a partial turn within the stand, causing the lugs 13 to engage below the hooks 9 until they come into contact with the vertical abutment 10.

The annulus 12 is provided with a skirt 14 which may be integral therewith. The lower end of this skirt is formed with a bead 15 which lies within the annulus 2 and rests upon the heads of the rivets 5$^a$ thus allowing an air space between the bead 15 and the flat bottom of the annulus 2. The skirt 14 is provided with numerous perforations 16, such perforation, as shown, being rectangular in shape so as to produce as large an opening as possible through the skirt. The purpose of these perforations is to permit the escape of the hot products of combustion from the lamp or heating device upward between the stand and the utensil, thereby causing a draft in this direction and keeping the hot gases from coming into direct contact with the stand. The metal interstices between the perforations also reduce the heat conducting surface and therefore serve to keep the stand cool.

It will be observed that the skirt 14, with the bead 15 on the lower edge thereof, lies within the trough shaped annulus 2 of the stand and is there centered in position by the engagement of the outer wall of said annulus. This skirt therefore serves as a centering device. It will also be observed, upon examination of Fig. 2, that the lower edge of the skirt 14 is below the plane of the bottom of the utensil. When the utensil is removed from the stand and placed upon a support it will be the lower edge of the skirt that engages with the support, while the bottom of the utensil will be elevated above the support. This will keep the hot contents of the receptacle from injuring the table, and also will keep the soot covered bottom of the utensil from coming in contact with the clean table cloth.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. In combination, a stand having supporting legs with hooked tops, and a trough-shaped annulus carried by said legs; and a utensil having a perforated depending skirt adapted to seat in said annulus, and lugs adapted to coöperate with the hooked tops of said legs.

2. In combination, a stand having a trough-shaped annulus for its top; and a utensil having a skirt secured to its outside near its bottom and extending outwardly and downwardly below the bottom of said utensil and adapted to rest in said annulus.

3. In a culinary article, a utensil having a depending skirt with openings therethrough, in combination with a stand having an annulus within which the skirt rests.

4. In a culinary article, the combination of a stand having a trough shaped annulus, and a receptacle having a depending skirt, the said skirt being perforated and lying within the annulus to center the receptacle and there being an air space between the skirt and the bottom of the annulus.

5. In a culinary article, the combination with a stand comprising a trough shaped annulus and supporting legs for the same and rivets for securing the annulus and stand together, of a receptacle having a depending skirt, the said skirt resting on the rivets and centering the receptacle.

This specification signed and witnessed this eighth day of Dec., 1909.

CHARLES NELSON.

Witnesses:
LEONARD H. DYER,
JOHN L. LOTSCH.

---

Copies of this patent may be obtained for five cents each, by addressing the "Commissioner of Patents, Washington, D. C."